UNITED STATES PATENT OFFICE.

THEODORE HURTZ, OF KANSAS CITY, MISSOURI.

ARTIFICIAL STONE OR MARBLE.

SPECIFICATION forming part of Letters Patent No. 354,834, dated December 21, 1886.

Application filed May 21, 1886. Serial No. 202,899. (No specimens.)

*To all whom it may concern:*

Be it known that I, THEODORE HURTZ, a citizen of the United States, residing at Kansas City, in the county of Jackson and State of Missouri, have invented certain new and useful Improvements in Artificial Stone or Marble, of which the following is a specification.

This invention relates to certain improvements in the manufacture of artificial stone; and it has for its objects to produce a compound which, when indurated, will be impervious to moisture and fire-proof, and which will practically resist all climatic influences, and will receive a finish or polish equal to that of natural stones of the best qualities.

In carrying out my invention I employ the following ingredients, in about the proportions named: water, one hundred parts; silicate of soda, one two-hundredth part; chloride of calcium, one four-hundredth part; hydrate of barium, (in solution,) one four-hundredth part; glycerine, one two-hundredth part; lime-water, one-twentieth part; carbonate of potash, (in solution,) three four-hundredth parts. These ingredients are placed in a suitable vat or vessel, and the whole is suitably agitated until they are all thoroughly dissolved.

When the stone is intended for building purposes or for other similar uses, I take hydraulic cement, one part; silicious sand, two parts, (more or less.) These I mix thoroughly in a suitable box or vessel, the compound constituting the outer surface of the finished artificial stone when prepared and formed as more fully hereinafter described. I then take hydraulic cement, one part; sand or coarse gravel, eight parts, (more or less.) These I mix in a suitable box or receptacle, the compound constituting the body of the stone when properly prepared.

The first-mentioned compound of cement and sand I moisten with the first-mentioned solution, and place the same in the bottom and at the sides of a suitable mold to about one-fourth of an inch in thickness. I then fill in with the last-mentioned composition of cement and sand or coarse gravel, tamping the whole until the mass becomes homogeneous and compact, after which the mold is removed, leaving the stone to set. The particles of the sand, gravel, and cement, in the presence of the solution above mentioned, will produce a coherent mass, and after standing for from four to six hours may be immersed in or saturated with the solution for three or four days. By this treatment an insoluble silicate of lime and baryta is formed in the pores of the stone, rendering it impervious to moisture and insusceptible to injurious climatic influences.

To prevent the compound from setting too rapidly in hot weather or in heated workshops, a certain amount of magnesia (say one pound, more or less) may be added to the mortar, if desired.

When a fine finish is required, after the stone is molded into proper shape for the formation of mantels, table-tops, grave-stones, or other purposes, or where an imitation of marble or any other stone of fine luster is required, I apply to the stone, as above prepared, pure linseed-oil, initially, and then apply the desired coloring-matters, as more fully hereinafter described.

The said coloring-matter is prepared as follows: I take dried clay, eighty parts; litharge, (powdered,) ten parts; brick-dust, ten parts; linseed-oil, three parts; Japan varnish, one part. These I mix to about the consistency of ordinary paint, and apply to the stone by means of a sponge. Various colors may be combined with this compound, so as to give a variegated surface to the stone. After this coating a final coating of varnish is applied to the stone, if intended for inside work; but where intended for outside work, where the stone will be subjected to exposure, a coating of glycerine, instead of the varnish, is applied.

The improved stone as thus prepared indurates quickly, and, by reason of the oily coating or surfacing, absolutely prevents the alkaline efflorescence to which all artificial stones are liable. This efflorescence is also in a great measure retarded and prevented by the character of the solution employed for moistening the cement and sand, as the potash and soda combine with the silicates, forming insoluble salts, which will not wash out to the surface, and which, moreover, tend to bind and cement the particles or crystallized portions of the ingredients of the stone securely together.

It is evident that the stone can be manufactured at much less expense than the cost of natural stone, and that it can be readily given any desired shape.

Having thus described my invention, what I claim, and desire to secure by Letters Patent, is—

1. The solution herein described for preparing artificial stone, the same consisting of water, silicate of soda, chloride of calcium, hydrate of barium, glycerine, lime-water, and carbonate of potash, in about the proportions named.

2. An artificial stone composed of hydraulic cement and sand or gravel, moistened and combined with a solution of water, silicate of soda, chloride of calcium, hydrate of barium, lime-water, glycerine, and carbonate of potash, substantially as specified.

In testimony whereof I affix my signature in presence of two witnesses.

THEODORE HURTZ.

Witnesses:
J. D. STAATS,
S. W. MOORE.